Nov. 4, 1969     W. F. ZELTMANN     3,475,765
VARIABLE DENSITY PROTECTIVE EYESHADE
Filed March 19, 1968
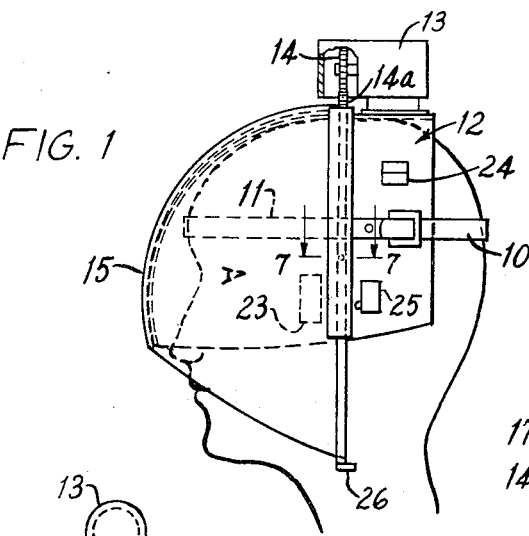
FIG. 1
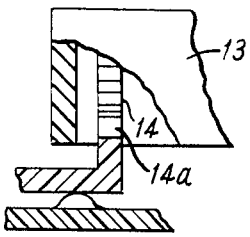
FIG. 5
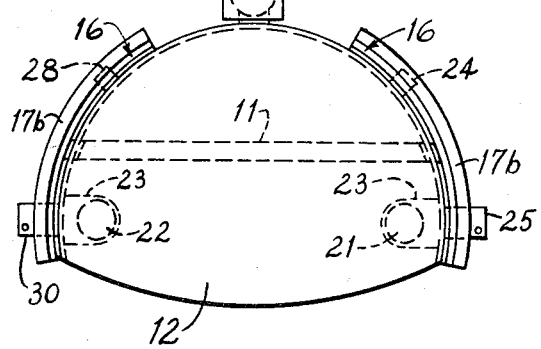
FIG. 2
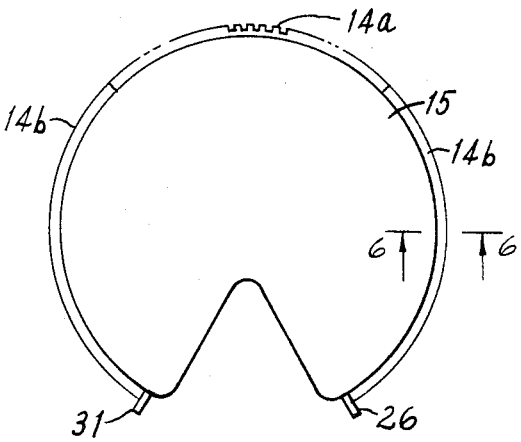
FIG. 7
FIG. 3
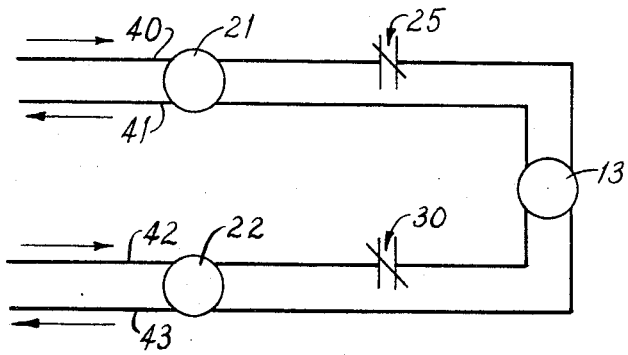
FIG. 4
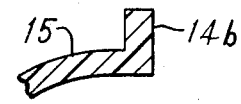
FIG. 6
INVENTOR
WALTER F. ZELTMANN
BY
Charles Marks United States Patent Office 3,475,765
Patented Nov. 4, 1969

3,475,765
VARIABLE DENSITY PROTECTIVE EYESHADE
Walter F. Zeltmann, 719 Bay Ridge Ave.,
Brooklyn, N.Y. 11220
Filed Mar. 19, 1968, Ser. No. 714,261
Int. Cl. A42b 1/06
U.S. Cl. 2—8         5 Claims

ABSTRACT OF THE DISCLOSURE

One or more photo-electric cells actuate a servomotor to rotate a light-polarized shield into confrontation with a light-polarized optical element covering the eyes of the user, thereby affording protection against light radiation to which said shield is exposed. Movement of the shield is confined by limit switches contactable therewith and operable to stop the servomotor when the shield moves to predetermined positions.

BACKGROUND OF THE INVENTION

Field of the invention

This invention relates to eye protecting devices for use in environments where light of harmful intensity may be encountered.

Description of the prior art

Heretofore, various means have been developed whereby polarized optical elements have been used in conjunction with goggles, masks and the like so as to permit the user to adjust said polarized elements manually and thereby protect his eyes from light deemed uncomfortable or harmful. Again, in the case of welding masks, it has been suggested that such control be exercised by means of regulation effected by the magnitude of the welding voltage employed on the welding job in connection with which the mask is used.

However, these conventional means for affording eye protection suffer from a variety of deficiencies. Thus, in the case of the manually adjustable devices, they tend to be slow cumbersome and dependent upon the reactions of the user who may or may not realize that the light to which he is exposed is harmful or who may not realize this in time to effect the required adjustment. Furthermore, fluctuations in light intensity may be too frequent to allow manual adjustment.

Again, the above-mentioned means for automatically controlling the light transmitted through a welding mask is not efficient since the light generated by welding operations is a function not only of the voltage employed but of many other factors, e.g., the position of the welder with respect to the welding job involved.

In addition, many previous polarizing devices impede the peripheral vision of the user and are unsafe in hazardous environments.

SUMMARY OF THE INVENTION

The present invention solves these problems by means of one or more photo-electric cells which are exposed to the source of light ordinarily transmitted to the eyes of the user and which photo-electric cells regulate a servo-mechanism whereby a light-polarized shield having a hollow curved conformation and confronting a light-polarized optical element also having a hollow curved conformation, is rotated with respect thereto so as to limit the intensity of light transmitted through the light-polarized optical element and to the eyes of the user.

Thus, the primary object of the invention is to provide an eyeshade or protective means which is automatically and quickly operable to limit the transmission of light of predetermined intensity.

Another object of the invention is to provide such an eyeshade or protective means which is light in weight and requires no skill or training on the part of the user.

Another object of the invention is to provide such an eyeshade or protective means which requires no manipulation or operation by the user and leaves him free to engage in other activities.

A further object of the invention is to provide such an eye shade or protective means which is not subject to clouding or other interference with vision by reason of condensation of the breath of the user in cold atmospheres.

A further object of the invention is to provide an eyeshade which does not restrict or inhibit the peripheral vision of the user.

A still further object of the invention is to provide an improved adjustable eyeshade or protective means of simple, sturdy and economical design.

Other objects and advantages of the present invention will become apparent from the following discussion when read in conjunction with the accompanying drawing.

BRIEF DESCRIPTION OF THE DRAWING

In the drawing:
FIG. 1 is a side elevational view depicting a preferred embodiment of the invention in operational use;
FIG. 2 is a front elevational view of the fixed optical element employed in said embodiment of the invention;
FIG. 3 is a front elevational view of the rotatable shield employed in said embodiment of the invention;
FIG. 4 is a diagram of the electric circuit which is used in said embodiment of the invention;
FIG. 5 is an enlarged, fragmentary, elevational view of the gear means and associated parts employed in said embodiment of the invention;
FIG. 6 is an enlarged cross-sectional view taken about the line 6—6 of FIG. 3;
FIG. 7 is an enlarged cross-sectional view taken about the line 7—7 of FIG. 1.

DESCRIPTION OF THE PREFERRED EMBODIMENT

As shown in FIGS. 1 and 2 of the accompanying drawing, a preferred form of the invention may be adjusted conveniently upon the head of the user by means of headbands 10, 11 of conventional design. Said headband 10, for example, may be secured to the external surface of the optical element, generally designated by the numeral 12, of the eye protective means hereafter described, and headband 11 may be secured to the internal surface of such element 12.

The optical element 12 is composed of a transparent material such as a transparent plastic and is surrounded by a servomotor 13 provided with a pinion 14 engaged with a curved rack 14a surmounting a shield 15 which is also composed of a transparent material such as a transparent plastic.

The curved rack 14a is intermediate of and aligned with a pair of curved flanges 14b surmounting the said shield 15 (see FIG. 6, for example). The rack 14a and flanges 14b are receivable in grooves 16 provided on opposing sides of the optical element 12, as seen in FIG. 2. As may be seen in FIG. 7, each groove 16 is defined by a casing having a base 17, a web 17a disposed normal to said base 17 and a lip 17b extending inwardly from said web 17a. The casing is also provided with a flange 17c abuttable against the outer face 12a of the optical element 12. A bolt 18 extends through the said flange 17c and optical element 12, where it is secured by a nut 19. The shield 15 is slidably engaged with the head 18a of said bolt 18.

When the pinion 14 is actuated by the servomotor 13, as hereinafter described, the shield 15 is rotated, the curved flanges 14b being thereby displaced through said casing.

The optical element 12 and shield 15 are each polarized with respect to light, by means well known to those skilled in the art, so that their planes of polarization are normally at a 45 degree angle with respect to each other. However, when the shield 15 is rotated, for example, in a clockwise direction when the shield is viewed from a point at the left of the form of the invention depicted in FIG. 1, the plane of polarization of the shield 15 is angularly displaced with respect to the plane of polarization of the optical element 12 thereby gradually diminishing the intensity of light which is transmissable through the optical element 12 to the eyes of the user. For example, if the shield 15 is in the position depicted in FIG. 3 with respect to the optical element 12 affixed in upright position, as in FIG. 2, the head of the user, the shield 15 and optical element 12 will permit transmission of light of median intensity to the eyes of the user but upon angular rotation of the shield 15, it will effect a corresponding reduction in the intensity of light transmissible through said shield 15 and optical element 12 to the eyes of the user.

To accomplish rotation of the shield 15, it is necessary to actuate the pinion 14 by means of the servomotor 13 in the manner hereinafter described. Thus, as may be seen in FIGS. 1 and 2, photo-electric cells 21, 22 are suitably disposed, as by providing housings 23 within the optical element 12, which housings 23 accommodate said photo-electric cells 21, 22 within the optical element 12, thereby exposing said photo-electric cells 21, 22 to light transmitted through the shield and optical element 12 to the vicinity of the eyes of the user.

Photo-electric cell 21 closes a power switch 24 whenever the intensity of the light transmitted through the optical element 12 and shield 15 exceeds a pre-determined maximum, corresponding to the predetermined maximum light intensity to which the eyes of the user may safely be exposed. Said photo-electric cell 21 is pre-adjusted by means well known to those skilled in the art, to respond to said maximum light intensity in the foregoing manner, close the power switch 24, which communicates with a suitable source of electricity, and actuate the servomotor 13 to rotate through a predetermined angular displacement the pinion 14, rack 14a and shield 15 affixed thereto, thereby angularly displacing the planes of polarization of said shield 15 and optical element 12 with respect to each other and holding the intensity of light transmissible therethrough within a predetermined safe limit.

Should the intensity of light to which the optical element 12 is exposed reach safe limits, the photo-electric cell 21, again by means well known to those skilled in the art, opens the switch 24, thereby stopping the servomotor 13.

In those situations where the said light intensity does not reach safe limits and said light intensity is such as to induce rotation of the shield 15 with respect to the optical element 12, so as to result in a maximum resistance to the transmission of light, a limit switch 25 affixed to the external surface of the optical element 12 is actuated to stop the servomotor 13 upon contact with a suitable portion of the shield 15, such as the stop 26 depicted in FIG. 3, thereby terminating the movement of said shield 15.

Photo-electric cell 22 is also mounted within the optical element 12 in a housing 23 provided within said optical element 12. By means well known to those skilled in the art, the photo-electric cell 22 is adjusted to close a power switch 28 whenever the intensity of the light transmitted to said photo-electric cell 22 through the shield 15 and optical element 12 falls below a predetermined minimum, e.g., whenever the intensity of light responsible for the previously described clockwise movement of the shield 15 is less than required for safe vision. Upon such closure of the power switch 28, the servomotor 13 is actuated to rotate the shield 15 in a counter-clockwise direction, when viewed from a point to the left of said shield in FIG. 1 of the drawing. This rotation decreases the angular displacement of the planes of polarization of the shield 15 and optical element 12, thereby permitting the light of lesser intensity to be transmitted to the eyes of the user after passing through the shield 15 and optical element 12.

A limit switch 30 surmounting the external surface of the optical element 12 and contactable with a stop 31 on the shield 15 stops the servomotor 13 when the shield 15 is rotated to its extreme counter-clockwise position, as when light of extremely limited intensity (less than the minimum intensity hereinabove referred to) induces rotation of the stop 31 into contact with the limit switch 30.

The wiring diagram for the foregoing arrangement is depicted in FIG. 4 where the photo-electric cells 21, 22 are connected to suitable conductors 40, 41, 42, 43 of electric currents and to limit switches 25, 30, as well as servomotor 13.

It is to be understood, however, that while the above described form of the invention employs two photo-electric cells, it is possible to adjust the circuits employed so as to make use of only one photo-electric cell.

If desired, both limit switches 25, 30 may also be connected to a suitable alarm signal so as to warn the user of conditions wherein the light passing through the shield 15 and optical element 12 is of an intensity greater than the permissible maximum or less than the desired minimum.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. In an eyeshade for use in an environment where light radiation of variable intensity is encountered, the combination comprising:
   (a) a polarized, transparent optical element;
   (b) headband means affixed to said optical element;
   (c) a polarized, transparent shield surmounting said optical element;
   (d) drive means surmounting said optical element;
   (e) driven means surmounting said shield and engaged with said drive means;
   (f) photo-electric means depending from the inner periphery of said optical element and exposed to said light radiation when it is transmitted therethrough and through said shield;
   (g) said photo-electric means actuating said drive means to rotate said shield with respect to said optical element, whereby the planes of polarization of said shield and optical element are angularly disposed with respect to each other to permit transmission therethrough of light radiation of a predetermined intensity;
   (h) guide means surmounting said optical element and slidably engaged with flange means on said shield.
2. In a device according to claim 1:
   (a) said optical element extending rearwardly of said shield;
   (b) said drive means including:
      (i) a motor provided with a rotatable shaft;
      (ii) a gear affixed to said rotatable shaft;
   (c) said driven means including a perimetric rack engaged with said gear.

3. In a device according to claim 2:
   (a) said perimetric rack being disposed intermediately of said flange means;
   (b) said guide means including:
       (i) a casing affixed to the outer marginal perimeter of the optical element by a plurality of bolt means;
       (ii) said flange means being accommodated within said casing and surmounting said bolt means.
4. In a device according to claim 1:
   (a) said photo-electric means including a pair of photo-electric cells accommodated within housings depending from opposing portions of the inner periphery of said optical element;
   (b) switch means surmounting said optical element and associated with said photo-electric cells and drive means;
   (c) said switch means being actuated by said photo-electric cells to operate said drive means.
5. In a device according to claim 1:
   (a) stop means disposed at the ends of said flange means;
   (b) limit switch means surmounting said optical element;
   (c) said limit switch means being contactable with said stop means to determine the operation of said drive means, thereby determining the extent of rotation of said shield.

References Cited
UNITED STATES PATENTS

| | | | |
|---|---|---|---|
| 2,423,320 | 7/1947 | Hurley | 2—8 |
| 2,423,322 | 7/1947 | Hurley | 250—225 |
| 3,245,315 | 4/1966 | Marks et al. | 351—49 |

JOSEPH V. TRUHE, Primary Examiner

L. A. ROUSE, Assistant Examiner

U.S. Cl. X.R.

250—225; 350—159; 351—49